INVENTOR
F. G. SCUDNER, JR.
BY David P. Kelley
ATTORNEY

United States Patent Office 3,454,811
Patented July 8, 1969

3,454,811
**GAS TUBE SURGE (OVERLOAD)
PROTECTION DEVICE**
Frank G. Scudner, Jr., Bethlehem, Pa., assignor to Bell
Telephone Laboratories, Incorporated, Murray Hill,
N.J., a corporation of New York
Filed Apr. 18, 1967, Ser. No. 631,729
Int. Cl. H01j 17/16, 61/30; H01k 1/28
U.S. Cl. 313—220                                    4 Claims

ABSTRACT OF THE DISCLOSURE

A surge (overload) protection device includes a tubular ceramic housing having a peripheral internal flange forming a pair of setbacks. Metal electrodes, which are disposed at either end of the housing to form a chamber for enclosing a gas, are each designed to have a peripheral step substantially complementary to, and in spaced relation with, the setbacks. Each setback is effectively shaded from metal sputtered from the electrodes under discharge conditions, thereby preventing a short circuit between the electrodes.

Background of the invention

This invention relates to a surge (overload) protection device, and more particularly to a gas tube surge protector for use in telephone communication systems.

It is common in the art of transmission system protection to connect a surge protection device between a transmission line and ground to protect the line as well as associated vulnerable equipment from electrical stress or overload damage caused by such hazards as lightning surges. The vulnerable equipment might include, for example, a transducer used to measure gas pressure in a coaxial tube, or the terminal equipment of a telephone carrier system.

A gas tube surge protector is a two state device which breaks down when a lightning surge strikes, or induces an abnormally high voltage upon, the transmission line. The surge protector inherently limits the voltage which subsequently appears across the line and its associated vulnerable equipment. The general requirements of such a protector include the ability (1) to handle many current pulses of moderate magnitude (e.g., 200 amps.) as well as occasional pulses of high magnitude (e.g., 2000 amps.), (2) to limit to safe values the surge voltage appearing at the terminals of vulnerable equipment, and (3) to withstand voltages normally appearing on the transmission line without experiencing electrical breakdown.

It had been customary in the art to utilize carbon block surge protectors (i.e., an air gap, carbon electrode protector), but their life time in areas with a high incidence of lightning is so short that today the art is turning to the use of gas tube surge protectors.

Gas tube surge protectors generally comprise a tubular ceramic or glass housing closed at each end by a metal electrode to form a chamber for enclosing a gas mixture. One of the electrodes is typically connected to the transmission line and the other to ground. When a lightning surge of abnormally high voltage appears on the line, the gas tube breaks down; that is, the gas ionizes causing an abrupt increase in current through the device. The high current resulting from the surge is shunted to ground, and the device inherently limits to safe values the voltage which appears across itself and therefore across vulnerable equipment with which it is effectively connected in parallel.

A major problem with gas tubes is the maintenance of the high resistance, typically $10^{12}$ ohms, of the device. Upon breakdown, the ionized gas causes sputtering and arc pitting of the metal electrodes. The sputtered material accumulates on the walls of the ceramic housing degrading the insulation resistance (typically to low values of $10^5$ ohms) and ultimately short circuiting the electrodes. The life time and integrity of the insulation resistance of prior art gas tubes is thereby greatly reduced.

Interelectrode continuity through the sputtered material on the ceramic walls can also interfere with the fidelity of transmission since it is effectively an unstable resistance and therefore a source of noise.

Although some prior art gas tubes utilize aluminum electrodes and helium gas, for example, to reduce sputtering, such gas tubes have an undesirably high surge limiting voltage.

Summary of the invention

The gas tube of the present invention utilizes the sputtering of its electrodes to initiate more rapidly the gas discharge and at the same time makes provision in the electrode configuration to avoid substantially short circuiting of the electrodes.

In an illustrative embodiment, the gas tube of the present invention comprises a tubular ceramic housing having a peripheral internal flange forming a pair of setbacks. Metal electrodes, which are disposed at either end of the housing to form a chamber for enclosing gas, are each designed to have a peripheral step substantially complementary to the setbacks. The electrodes are not, however, in contact with the setbacks; a gap of small spacing is established by design between the electrode steps and the ceramic setbacks.

Each setback is effectively shaded from metal sputtered from the electrodes upon ionization of the gas. Although the ceramic wall may become heavily coated with sputtered metal, the setbacks do not. The combination of two setback-gaps further guards against the statistically probable occasional sputtering activity at or near a setback-gap. Consequently, the device integrity is maintained (i.e, the insulation resistance of the device remains high for extended periods of surge discharge activity) by preventing the occurrence of a short circuit between the electrodes.

In addition, the gas tube can be constructed in combination with a center step, formed on the peripheral step of each electrode in order to concentrate sputtering during typical discharge conditions to the center of the device chamber, away from the ceramic walls and setbacks. The center step may extend into the space defined by the peripheral internal flange. The combination of the shaded setbacks and center steps greatly improves the reliability of the gas tube protector by increasing its service life time under bilateral (either polarity) surge conditions and by reducing its effect as a source of noise caused by instability of interelectrode insulation resistance.

It has been found, in addition, that a coating of carbon deposited on the electrode faces greatly reduces arc pitting of the electrodes caused by surge current conduction via ionization of the gas mixture. The carbon coating also lowers the voltage drop between the electrodes during arc discharge conditions with consequent lower power dissipation in the tube.

Description of the drawings

The invention, together with its various features and advantages, can be easily understood from the following more detailed description taken in conjunction with the accompanying drawings, in which.

*Detailed description of the invention*

Figure 1:
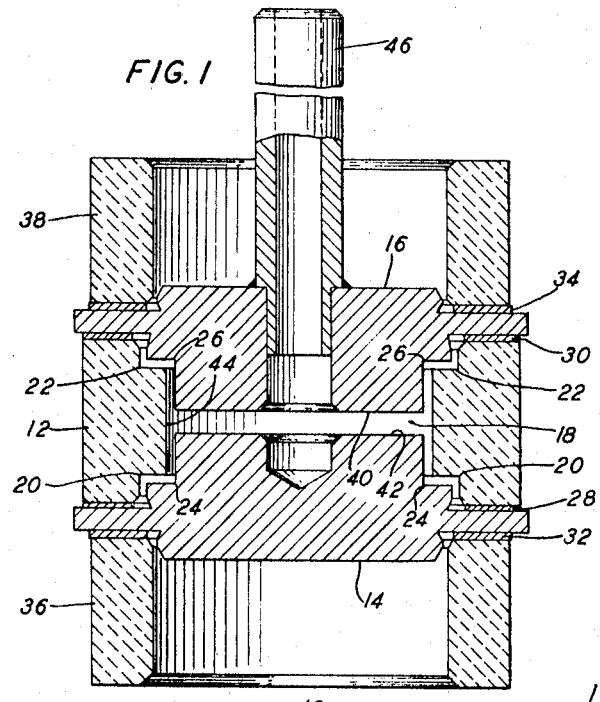
FIG. 1 is a cross-sectional view of one embodiment of the invention showing the shaded setbacks.

Turning now to FIG. 1, there is shown as gas tube surge (overload) protector 10 comprising a tubular center ceramic housing 12 closed at each end by electrodes 14 and 16, typically made of copper, thereby forming a chamber 18 for enclosing a gas or gas mixture, not shown.

The ceramic 12 has an internal flange forming first and second annular setbacks 20 and 22. Each electrode 14 and 16 has a peripheral step 24 and 26, respectively, substantially complementary to, and in spaced relation to, the setbacks 20 and 22, respectively. The electrodes are brazed at seal surfaces 28 and 30 to the center ceramic 12, which is metalized at these two seal surfaces, and are brazed at 32 and 34 to end ceramics 36 and 38 which are also each metalized at their respective seal surfaces. The end ceramics balance the stress on the braze seals and complete the unitary structure of the gas tube 10. The braze is formed, typically, by a Cu-Ag eutectic alloy and the ceramic seal surfaces are typically a molybdenum-manganese metalization.

By techniques well known in the art, the chamber 18 is evacuated and outgassed via the tubulation 46 to a pressure of approximately $5 \times 10^{-6}$ torr, and then filled with a gas mixture, typically 10 percent hydrogen-90 percent argon, to a pressure of about 70 torr.

The gas tube 10 should generally be electrically aged before actual field use begins. During aging the tube is conditioned by pulsing it at some predetermined current levels. The aging process serves to clean the electrodes by the sputtering action of the gas discharge, and is advantageous in that it causes a thin layer of sputtered electrode material to be deposited on walls 44 of the center ceramic 12. This thin metal layer serves to initiate the gas discharge is a very short time when a surge pulse is applied to the tube; the discharge may start near the wall 44 and then expand to fill the gap between the electrodes 14 and 16. Alternatively, the coating upon the ceramic can be pre-applied allowing for better quality control of the tube characteristics.

Although it is desirable, as indicated above, that a thin layer of sputtered material cover the wall 44, it is important that the entire inner surface of the center ceramic 12 between the electrodes 14 and 16 not be so covered. Otherwise, the electrodes 14 and 16 would be short circuited. To prevent such an occurrence, the gas tube 10 is constructed with the setbacks 20 and 22 in spaced relation to matching steps 24 and 26. This construction effectively shades the setbacks 20 and 22 from being coated with sputtered metal from the electrodes, thereby preventing a short circuit.

Figure 2:
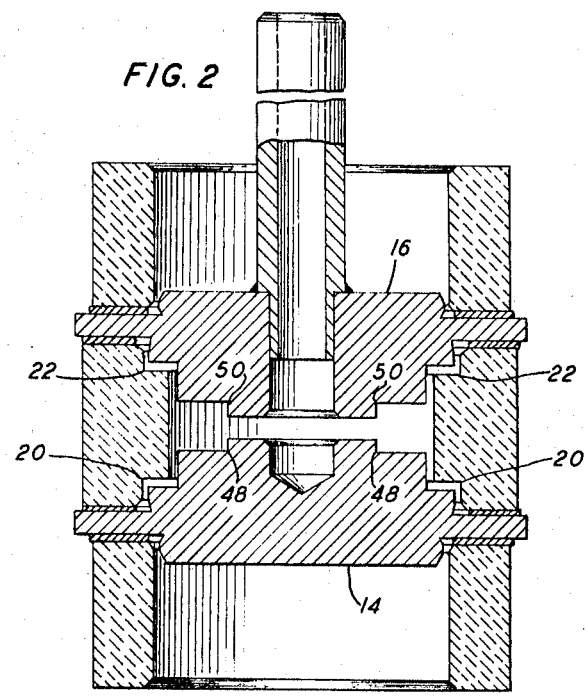
FIG. 2 is a cross-sectional view of a second embodiment of the invention showing the shaded setbacks in combination with the center steps.

In addition, each of the electrodes 14 and 16 can be constructed as shown in FIG. 2, to have a central step 48 and 50, respectively, to localize the sputtering generally to the center of the electrodes, away from the ceramic wall 44 and the setbacks 20 and 22. This electrode configuration further insures that metal sputtered from the electrodes does not coat the setbacks 20 and 22.

Under arc discharge conditions the faces 40 and 42 of the electrodes typically become pitted. By coating the faces 40 and 42 with a thin layer of carbon, not shown, such arc pitting is virtually eliminated.

Figure 3A:
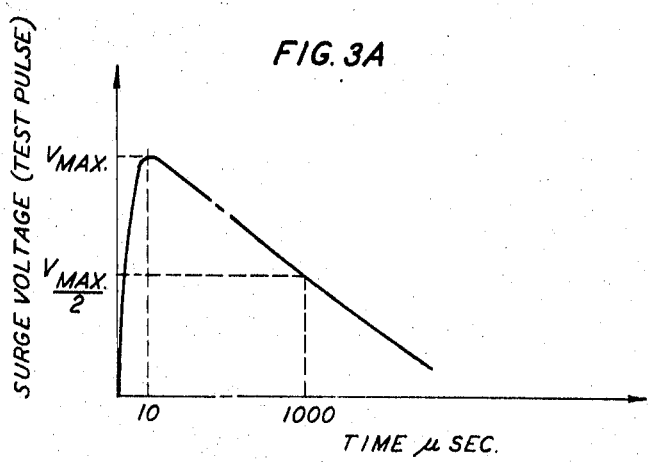
FIG. 3A is a graph of the voltage-time characteristic of a theoretical lightning surge pulse used for surge breakdown voltage tests.
Figure 3B:
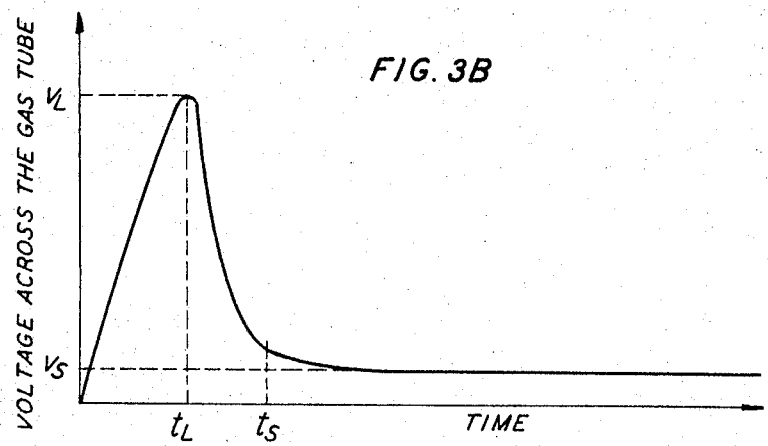
FIG. 3B is a graph of a typical voltage-time characteristic of a gas tube in accordance with the present invention in response to the surge pulse of FIG. 3A.

The voltage-time characteristic shown in FIG. 3B is that of a typical gas tube 10 in response to the surge pulse of FIG. 3A. The voltage surge, typical of the lightning surges, rises to its maximum (e.g., 1000 volts) in about 10 $\mu$sec., and then decays to one half its maximum approximately 1000 $\mu$sec. later. This voltage when impressed across the tube is limited, as shown in FIG. 3B, to the surge limiting voltage $V_L$, typically about 400 volts, in a time $t_L$, about 1.0 $\mu$sec. The time $t_L$ corresponds approximately to a 450 volt/$\mu$sec. rate-of-rise pulse. For actual surges having a higher rate-of-rise, $t_L$ is correspondingly shorter. After time $t_L$ the voltage drops off rapidly until time $t_S$, typically less than 2 $\mu$sec., when it reaches the sustain voltage $V_S$. The sustain voltage may be as high as 180 volts under glow discharge conditions (not illustrated), or as low as approximately 25 volts in an arc discharge mode. The arc discharge mode, which occurs at a conduction current of about two amperes, is more likely when dissipating the high currents of lightning surges. If, in addition, the electrodes' faces are coated with a thin layer of carbon, $V_S$ is reduced even further, to approximately 10 volts and arc conduction is established at a lower current level (e.g., less than one ampere).

The above discussion applies not only to positive surge pulses, but also to negative surge pulses, since, of course, lightning can generate surges of either polarity. The gas tube described herein in response to a negative polarity pulse, however, has a surge limiting voltage $V_L$ typically less than 500 volts. The difference between $V_L$ for positive and negative pulses may be attributed to the present aging technique (i.e., normally aging with positive pulses). This anomaly appears correctable, if necessary, by electrode design and aging technique variations.

The gas tube of the present invention, because of its symmetrical electrode construction, is capable of extended bilateral operation. That is, it typically maintains its high insulation resistance even after application of more than 500 bilateral life test surge pulses (pulses of alternate polarity). In contrast, the insulation resistance of similar prior art gas tube protectors without setback geometry degrades from $10^{12}$ to $10^5$ or $10^6$ ohms after only about 35 bilateral life test surge pulses. The life test surge pulses are defined typically as having 150 to 300 amperes peak current with a rise time of approximately 1 $\mu$sec. and fall time of approximately 250 $\mu$sec. at half the peak current. During life test these pulses are applied at a rate of about 25 pulses per minute.

A gas tube is characterized by two breakdown voltages: a surge breakdown in response to a fast rate-of-rise pulse (e.g., 450 volts/$\mu$sec.), and a static breakdown in response to a slow rate-of-rise pulse. The surge breakdown voltage of the gas tube 10 is typically about 400 volts. The static or D.C. breakdown voltage should be greater than voltages normally appearing on the transmission line. Typical voltages appearing on a telephone carrier system are 135 volts D.C. (for supplying power) and 180 peak volts A.C. (a ringing signal). The static breakdown voltage is, therefore, usually about 250 volts.

Typical dimensions of the gas tube 10 are indicated in the table below.

| | | |
|---|---|---|
| Overall length | inch | 0.50 |
| Overall width | do | 0.42 |
| Electrode thickness | mils | 135 |
| Electrode spacing | do | 20 |
| Spacing between setback and peripheral step | do | 5 |
| Central step height | do | 10 |
| Peripheral step height | do | 36 |

The above dimensions are illustrative only and are not to be considered as limitations upon the scope of the invention.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:
1. A surge protection device comprising
   a tubular insulative housing having a peripheral internal flange forming first and second setbacks,
   first and second electrodes in spaced relation to one another disposed at the ends of said tubular housing, thereby to form a chamber for enclosing a gas capable of rapid ionization upon the application of a surge voltage to said electrodes,
   said first and second electrodes characterized by a material which, on the impact of ions of the gas, sputters the material of said electrodes onto the interior wall of said insulative housing,
   said first electrode having a peripheral raised portion substantially complementary to said first setback, and in spaced relation thereto, to shade said first setback from the sputtered material, and said second electrode having a peripheral raised portion substantially complementary to said second setback, and in spaced relation thereto, to shade said second setback from the sputtered material, thereby preventing a short circuit between said electrodes by preventing the sputtered material from coating said setbacks.
2. The surge protection device of claim 1 in combination with
   a first central raised portion disposed on said peripheral raised portion of said first electrode, and
   a second central raised portion disposed on said peripheral raised portion of said second electrode, and disposed opposite said central raised portion of said first electrode, thereby to localize much of the sputtering to the center of said electrodes and away from said interior wall and said setbacks.
3. The surge protection device of claim 1 in combination with a layer of carbon deposited on the faces of said electrodes.
4. The surge protection device of claim 1 wherein said electrodes comprise copper.

References Cited

UNITED STATES PATENTS

| | | | |
|---|---|---|---|
| 2,365,517 | 12/1944 | Berkey | 313—44 |
| 2,900,476 | 8/1959 | Reece | 317—62 |

JAMES W. LAWRENCE, *Primary Examiner.*

R. F. HOSSFELD, *Assistant Examiner.*

U.S. Cl. X.R.

313—214, 239; 317—62